Patented Aug. 30, 1927.

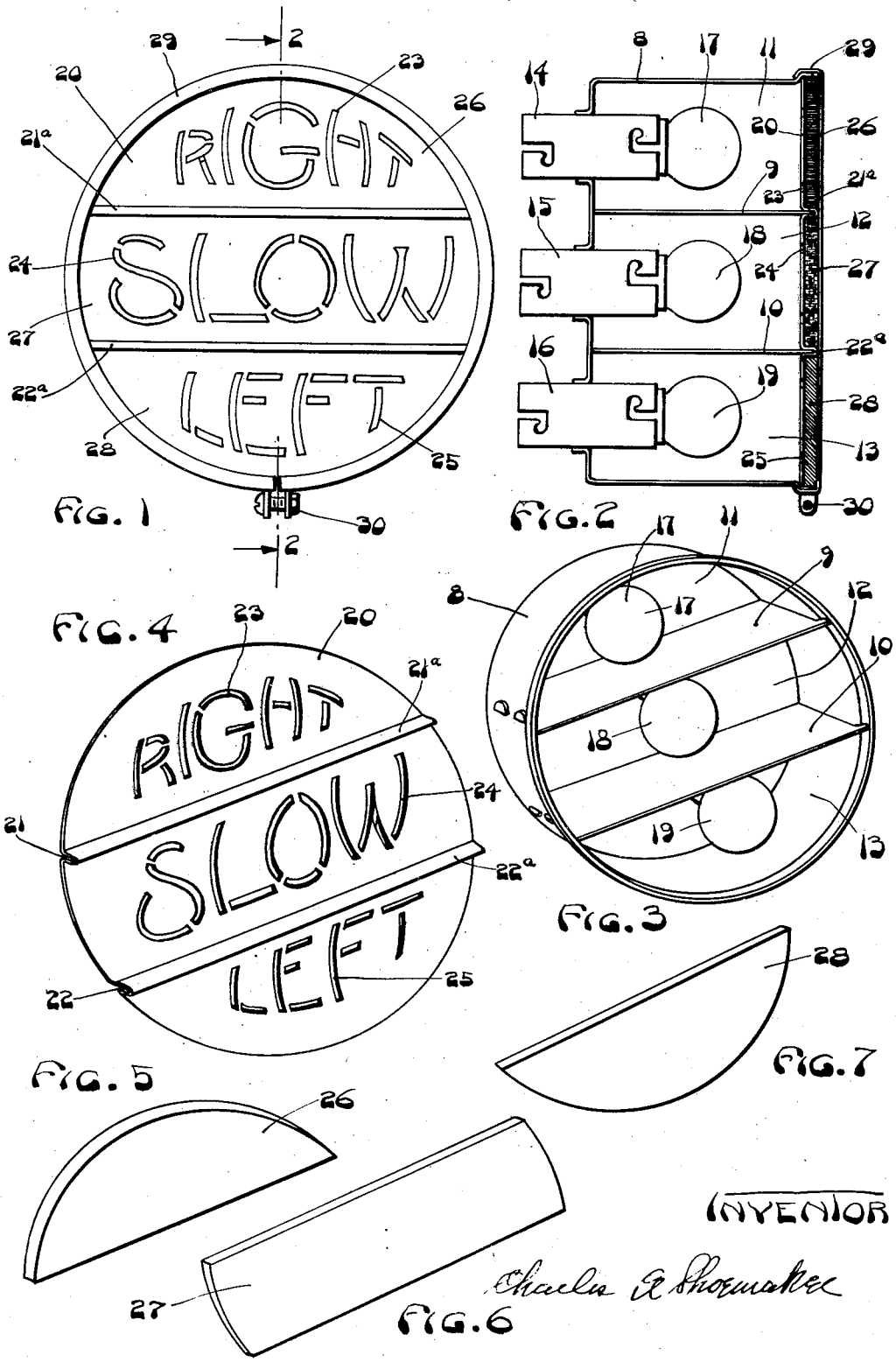
Aug. 30, 1927.
C. A. SHOEMAKER
1,641,056
VEHICLE SIGNAL LAMP
Filed March 20, 1926

1,641,056

UNITED STATES PATENT OFFICE.

CHARLES A. SHOEMAKER, OF NEAR MIDDLETOWN, OHIO.

VEHICLE SIGNAL LAMP.

Application filed March 20, 1926. Serial No. 96,349.

This invention relates to particularly a vehicle lamp for the projection of signals designed to indicate the intention of the driver of an automobile as to a subsequent change of direction or other operation of the vehicle, as for example a right turn, a left turn, and a slow or caution signal.

An object of the lamp invention disclosed herein is to produce a simple, compact, easily understood, substantial and of relatively cheap construction which may be mounted in any convenient place or in position upon a vehicle and which is simple to operate and repair.

These and other objects are attained in the lamp disclosed in the following specification and illustrated in the accompanying drawing in which:—

Fig. 1 is a front elevation of a lamp embodying my invention.

Fig. 2 is a vertical sectional view of the lamp shown in Fig. 1, and taken on the line 2—2 thereof.

Fig. 3 is a perspective view disclosing the interior of the body of the lamp shown in Figs. 1 and 2.

Fig. 4 is a perspective view of the stencil plate which contains the signal designations and which, when in position, operates as a part of the metal structure of the lamp.

Figs. 5, 6 and 7 are respectively top, middle and bottom sections of different colored glass to cover the stencil plate shown in Fig. 4.

A body 8 of sheet metal or other material of cylindrical shape, is provided with a closed end and an enlarged open end with sheet metal partitions 9 and 10 which divide the interior of the body into three compartments 11, 12 and 13. Within these respective compartments connectors 14, 15 and 16 are located for holding the respective lamp bulbs 17, 18 and 19. The open end of the lamp body is enlarged to receive a circular stencil plate 20, with shelves formed integrally upon its face out of the material of which it is made, two grooves 21 and 22 being formed in the rear of the shelves to fit over the respective partitions 9 and 10 which are fitted into the body while the upper portions of the partitions have longitudinally extending fingers which rest on the bottom of the enlarged open end of the body. Thus the stencil plate is divided into three flat-sections by the walls 21ª and 22ª which are produced in the folding of the metal to form the grooves 21 and 22 so that when the stencil plate is fitted upon the partitions it is prevented thereby from turning. In these three flat sections the respective signal designations 23, 24 and 25 are stencil cut. These sections also form channels to receive glass strips 26, 27 and 28 which cover the stencil. Glass 26 is preferably blue as indicated by the sectioning shown in Fig. 2, glass 27 is preferably yellow as its sectioning indicates, and glass 28 is preferably green as its sectioning indicates. A split finishing band 29 surrounds the assembled glass strips and stencil and binds them in position relatively to the enlarged open end of the body, a fastening 30 being provided for clamping purposes.

Any suitable means may be employed for controlling the illumination of the lamp bulbs 17, 18 and 19, as for example, bulbs 17 and 19 may be controlled by suitable switches on the respective right and left hand sides of the steering wheel, while bulb 18 may be controlled by a switch suitably connected with the brake pedal. The walls 21ª and 22ª serve to prevent light from one glass being cast through and conflicting with the color of the adjacent glass.

Having thus described my invention what I claim is:—

A vehicle signal lamp comprising an open ended body, a series of partitions fixed in spaced relation in the body and dividing it into compartments, a lamp in each compartment, a stenciled signal-designating plate covering the compartments and folded to form shelves on its front face with grooves in its rear face to receive the forward edges of the partitions, a portion of the stencil occupying the opening to each compartment, a glass of different color covering each stencil portion, with one of said plate shelves between adjacent glasses, and means adapted to retain the plate and glass coverings in position.

In witness whereof I affix my signature.

CHARLES A. SHOEMAKER.